(12) United States Patent
Demirovic et al.

(10) Patent No.: US 10,029,640 B2
(45) Date of Patent: Jul. 24, 2018

(54) METHOD AND APPARATUS FOR DETECTING AIRBAG DEPLOYMENT

(71) Applicant: GM GLOBAL TECHNOLOGY OPERATIONS LLC, Detroit, MI (US)

(72) Inventors: Orhan Demirovic, Sterling Heights, MI (US); Thomas P Deming, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 57 days.

(21) Appl. No.: 15/244,921

(22) Filed: Aug. 23, 2016

(65) Prior Publication Data

US 2018/0056911 A1    Mar. 1, 2018

(51) Int. Cl.
*B60R 21/015* (2006.01)
*B60R 21/01* (2006.01)
*B60R 21/00* (2006.01)

(52) U.S. Cl.
CPC .. *B60R 21/01508* (2014.10); *B60R 21/01504* (2014.10); *B60R 2021/0027* (2013.01); *B60R 2021/01286* (2013.01)

(58) Field of Classification Search
CPC ........ B60R 21/01508; B60R 21/01504; B60R 2021/0027; B60R 2021/01286
See application file for complete search history.

(56) References Cited

U.S. PATENT DOCUMENTS

2005/0280516 A1* 12/2005 Chen .................... B60R 25/1004
                                                    340/426.1
2017/0171734 A1* 6/2017 Lee .................... H04M 1/72538

* cited by examiner

*Primary Examiner* — Abby Yee Lin

(57) ABSTRACT

A method and apparatus for detecting airbag deployment are provided. The method includes: detecting air pressure information corresponding to air pressure inside a vehicle cabin; determining whether a value corresponding to the air pressure information is greater than a predetermined value; and performing a function in response to determining that the value is greater than the predetermined value.

16 Claims, 5 Drawing Sheets

METHOD AND APPARATUS FOR DETECTING AIRBAG DEPLOYMENT

INTRODUCTION

Apparatuses and methods consistent with exemplary embodiments relate to detecting airbag deployment. More particularly, apparatuses and methods consistent with exemplary embodiments relate to backup airbag deployment detection.

SUMMARY

One or more exemplary embodiments provide a method and an apparatus that detect airbag deployment. More particularly, one or more exemplary embodiments provide a method and an apparatus that detect airbag deployment by detecting a change in air pressure inside of a vehicle cabin.

According to an aspect of an exemplary embodiment, a method for detecting airbag deployment is provided. The method includes detecting air pressure information corresponding to air pressure inside a vehicle cabin; determining whether a value corresponding to the air pressure information is greater than a predetermined value; and performing a function in response to determining that the value is greater than the predetermined value.

The air pressure information may be detected by air pressure sensors disposed in at least one from among a vehicle door, a vehicle dashboard, a center stack, a vehicle floor, an instrument panel, an A-pillar, a B-Pillar, a C-Pillar, and a vehicle roof.

The performing the function may include at least one from among transmitting information to dispatch emergency workers and transmitting information indicating airbag deployment. The performing the function may further include transmitting location information.

The air pressure information may include a value corresponding to the air pressure inside the vehicle cabin.

The air pressure information may include a value corresponding to a change in the air pressure inside the vehicle cabin.

According to an aspect of another exemplary embodiment, an apparatus for detecting airbag deployment is provided. The apparatus includes at least one memory comprising computer executable instructions; and at least one processor configured to read and execute the computer executable instructions, the computer executable instructions causing the at least one processor to: detect air pressure information corresponding to air pressure inside a vehicle cabin; determine whether a value corresponding to the air pressure information is greater than a predetermined value; and perform a function in response to determining that the value is greater than the predetermined value.

The apparatus may further include a plurality of sensors configured to provide air pressure information.

The plurality of air pressure sensors may be disposed in at least one from among a vehicle door, a vehicle dashboard, a center stack, a vehicle floor, an instrument panel, an A-pillar, a B-Pillar, a C-Pillar, and a vehicle roof.

The function may include at least one from among transmitting information to dispatch emergency workers and transmitting information indicating airbag deployment. The function may further include transmitting location information.

The air pressure information may include a value corresponding to the air pressure inside the vehicle cabin.

The air pressure information may include a value corresponding to a change in the air pressure inside the vehicle cabin.

According to an aspect of another exemplary embodiment, a non-transitory computer readable medium comprising computer executable instructions executable by a processor to perform the method for detecting airbag deployment. The method includes determining whether at least one opening of a vehicle cabin is closed; detecting air pressure information corresponding to air pressure inside the vehicle cabin; determining whether a value corresponding to the air pressure information is greater than a predetermined value; and performing a function in response to determining that the value is greater than the predetermined value and the at least one opening of the vehicle cabin is closed.

Other objects, advantages and novel features of the exemplary embodiments will become more apparent from the following detailed description of exemplary embodiments and the accompanying drawings.

DETAILED DESCRIPTION

Figure 1:
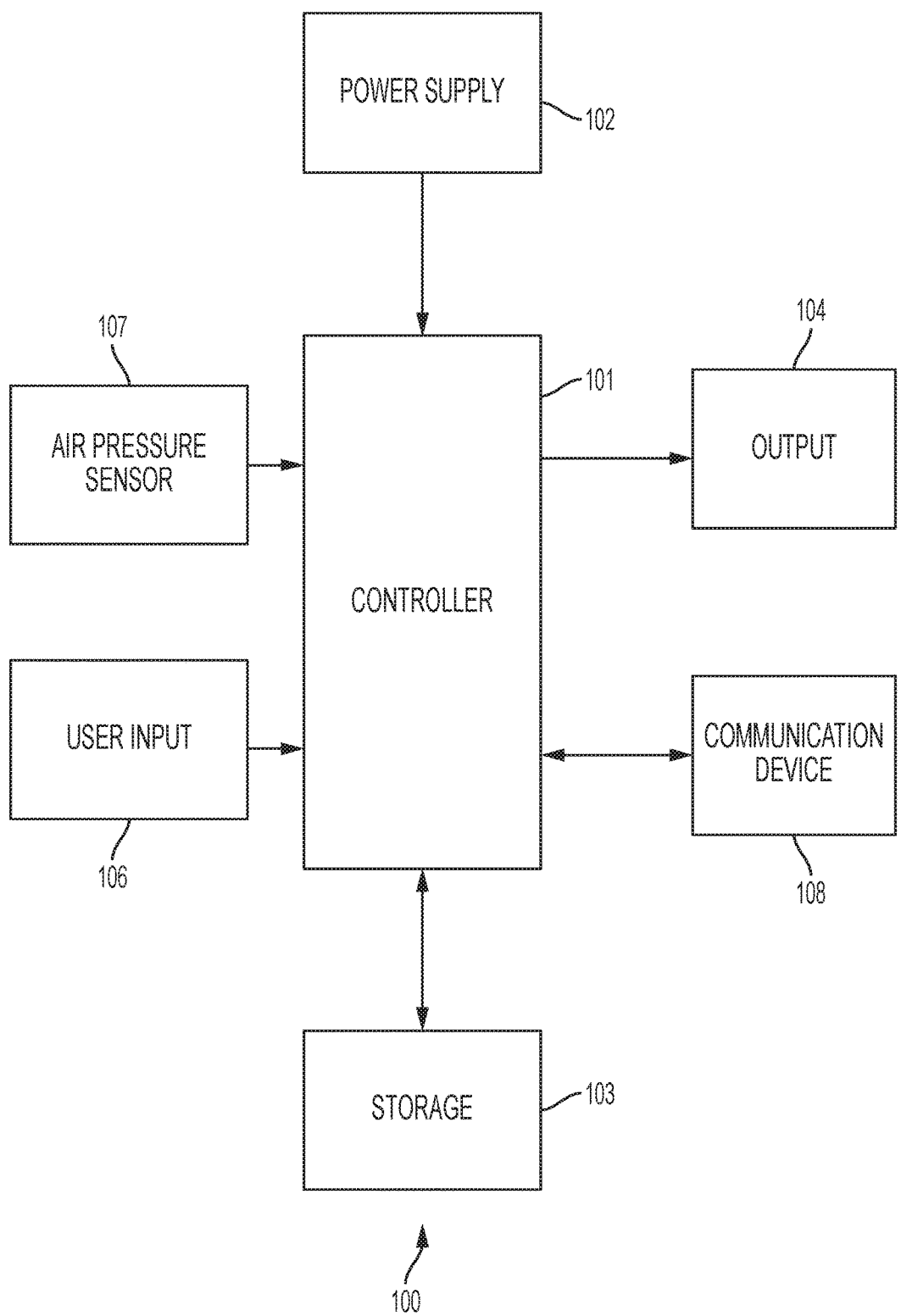
FIG. 1 shows a block diagram of an apparatus that detects airbag deployment according to an exemplary embodiment.

An apparatus and method that detect airbag deployment will now be described in detail with reference to FIGS. 1-5 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or combined into one or more devices. In addition, individual elements may be provided on separate devices.

Vehicles may contain airbags that are deployed or inflated when a collision occurs. The deployment or initiation of the inflation may be detected via the sensing and diagnostic module (SDM) or communication line. The detection of the deployment or initiation of the inflation of the airbag may not be possible in a situation where the collision compromises the SDM and/or communication lines. However, a backup detection system may be used to detect a collision and/or the deployment of the airbag. The backup detection system may be used to detect airbag deployment caused many types of accidents such as front, side, rollover accidents or collisions.

FIG. 1 shows a block diagram of an apparatus for detecting airbag deployment 100 (i.e., an apparatus for detecting a collision) according to an exemplary embodiment. As shown in FIG. 1, the apparatus for detecting deployment 100, according to an exemplary embodiment, includes a controller 101, a power supply 102, a storage 103, an output 104, a user input 106, an air pressure sensor 107, and a communication device 108. However, the apparatus for detecting airbag deployment 100 is not limited to the aforementioned configuration and may be configured to include additional elements and/or omit one or more of the aforementioned elements. The apparatus for detecting airbag deployment 100 may be implemented as part of a vehicle or as a standalone component.

The controller 101 controls the overall operation and function of the apparatus for detecting airbag deployment 100. The controller 101 may control one or more of a storage 103, an output 104, a user input 106, an air pressure sensor 107, and a communication device 108 of the apparatus for detecting airbag deployment 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the user input 106, the air pressure sensor 107, and the communication device 108 of the apparatus for detecting airbag deployment 100. The information may be sent and received via a bus or network, or may be directly read or written to/from one or more of the storage 103, the output 104, the user input 106, the air pressure sensor 107, and the communication device 108 of the apparatus for detecting airbag deployment 100. Examples of suitable network connections include a controller area network (CAN), a media oriented system transfer (MOST), a local interconnection network (LIN), a local area network (LAN), and other appropriate connections such as Ethernet.

The power supply 102 provides power to one or more of the controller 101, the storage 103, the output 104, the user input 106, the air pressure sensor 107, and the communication device 108 of the apparatus for detecting airbag deployment 100. The power supply 102 may include one or more from among a battery, an outlet, a capacitor, a solar energy cell, a generator, a wind energy device, an alternator, etc.

The storage 103 is configured for storing information and retrieving information used by the apparatus for detecting airbag deployment 100. The storage 103 may be controlled by the controller 101 to store and retrieve air pressure information such as air pressure level inside a vehicle cabin, change in air pressure inside the vehicle cabin, etc. The storage 103 may also include the computer instructions configured to be executed by a processor to perform the functions of the apparatus for detecting airbag deployment 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus for detecting airbag deployment 100. The output 104 may include one or more from among a speaker, a display, a centrally-located display, a head up display, a windshield display, a haptic feedback device, a vibration device, a tactile feedback device, a tap-feedback device, a holographic display, an instrument light, an indicator light, etc.

The output 104 may output notification including one or more from among an audible notification, a light notification, and a display notification. The notification may include information regarding one or more from among a collision, airbag deployment, and contacting emergency responders, etc.

The user input 106 is configured to provide information and commands to the apparatus for detecting airbag deployment 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to receive a user input to cycle through notifications or different screens of a notification. In yet another example, the user input 106 may be used by the user to initiate communication to request emergency responders, tow trucks, etc., as well as to communicate with an operator at a call center to make the request.

The air pressure sensor 107 is configured to detect an air pressure level or a change in air pressure in a vehicle cabin. The air pressure sensor 107 may be an analog reference pressure sensor. The air pressure sensor 107 may include a plurality of air pressure sensors. The air pressure sensor may provide air pressure information including one or more from among an air pressure level or a change in air pressure in a vehicle cabin, to the controller 101 via a bus, storage 103 or communication device 108. The air pressure sensors may be positioned in at least one from among a vehicle door, a vehicle dashboard, a vehicle floor, and a vehicle roof.

The communication device 108 may be used by apparatus for detecting airbag deployment 100 to communicate with various types of external apparatuses according to various communication methods. The communication device 108 may be used to send air pressure information to the controller 101 of the apparatus for detecting airbag deployment 100. The communication device 108 may also be configured to transmit the notification of airbag deployment, collision, etc., to a mobile device such as mobile phone, smart watch, laptop, tablet, etc. so that the notification is output by the mobile device. Moreover, the communication device 108 may transmit the notification of airbag deployment, collision, etc., to a law enforcement agency, emergency responders, a call center, a transportation service, a family member, or other designated contact, along with location information indicating a location of a vehicle. The location information may be determined from information received from a global positioning system (GPS) receiver.

The communication device 108 may be provide both voice and data communication. By providing both voice and data communication, the communication device 108 enables the vehicle to offer a number of different services including those related to navigation, telephony, emergency assistance, diagnostics, infotainment, etc. Data can be sent either via a data connection, such as via packet data transmission over a data channel, or via a voice channel. For combined services that involve both voice communication (e.g., with a live advisor or voice response unit at a call center) and data communication (e.g., to provide GPS location data or vehicle diagnostic data to the call center), the system can utilize a single call over a voice channel and switch as needed between voice and data transmission over the voice channel.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as 3$^{rd}$ generation (3G), 3$^{rd}$ generation partnership project (3GPP), long term evolution (LTE), Bluetooth, EVDO, CDMA, GPRS, EDGE or ZigBee.

According to another exemplary embodiment, the controller 101 of the apparatus for detecting airbag deployment 100 may be configured to detect air pressure information corresponding to air pressure inside a vehicle cabin, determine whether a value corresponding to the air pressure information is greater than a predetermined value, and perform a function in response to determining that the value is greater than the predetermined value.

According to an exemplary embodiment, the controller 101 of the apparatus for detecting airbag deployment 100 is configured to determine whether at least one opening of a vehicle cabin is closed, detect air pressure information corresponding to air pressure inside the vehicle cabin, determine whether a value corresponding to the air pressure information is greater than a predetermined value, and perform a function in response to determining that the value is greater than the predetermined value and the at least one opening of the vehicle cabin is closed.

Figure 2:
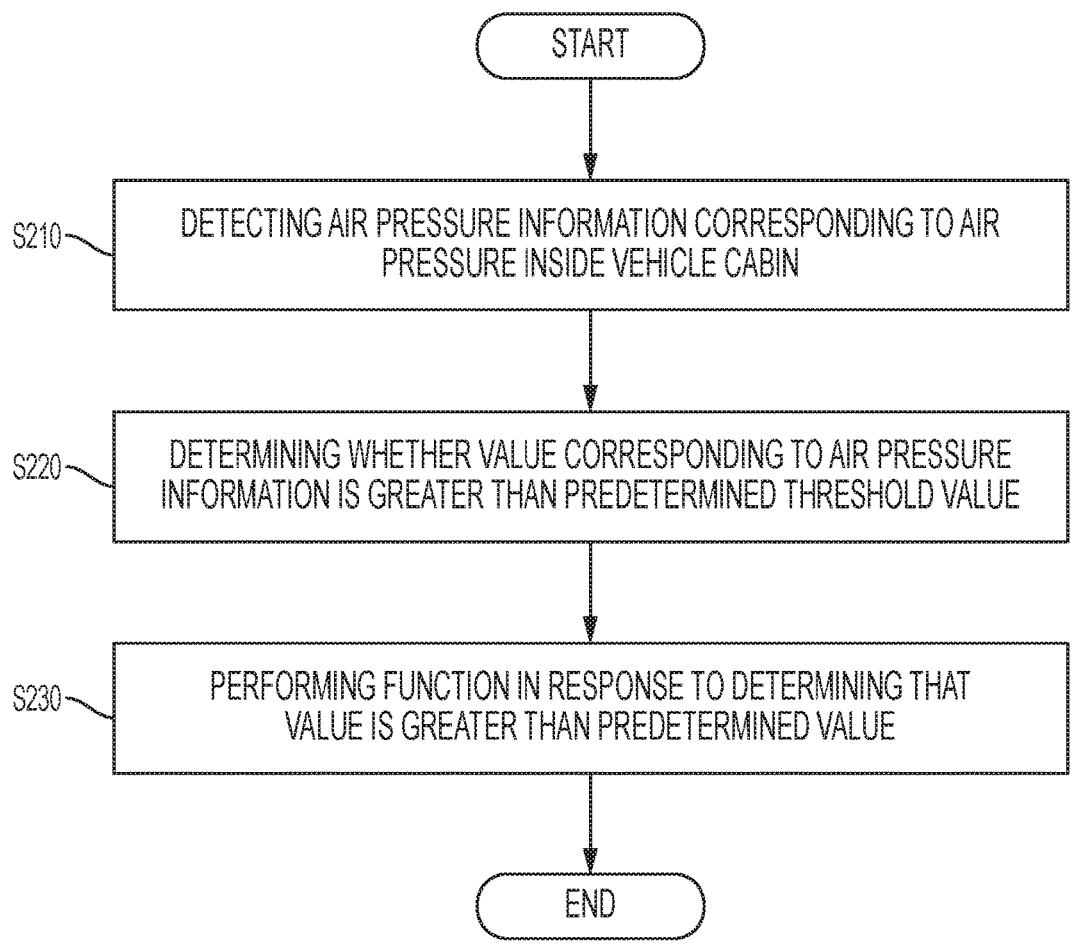
FIG. 2 shows a flowchart for a method of detecting airbag deployment according to an aspect of an exemplary embodiment.

FIG. 2 shows a flowchart for a method for detecting airbag deployment according to an exemplary embodiment. The method of FIG. 2 may be performed by the apparatus for detecting airbag deployment 100 or may be encoded into a computer readable medium as instructions that are executable by a computer to perform the method.

Referring to FIG. 2, air pressure information corresponding to air pressure inside a cabin of a vehicle is detected in operation S210. It is then determined whether a value corresponding to air pressure information is greater than a predetermined threshold value in operation S220. In operation S230, a function is performed in response to determining that the value corresponding to air pressure information is greater than the predetermined threshold value.

Figure 3:
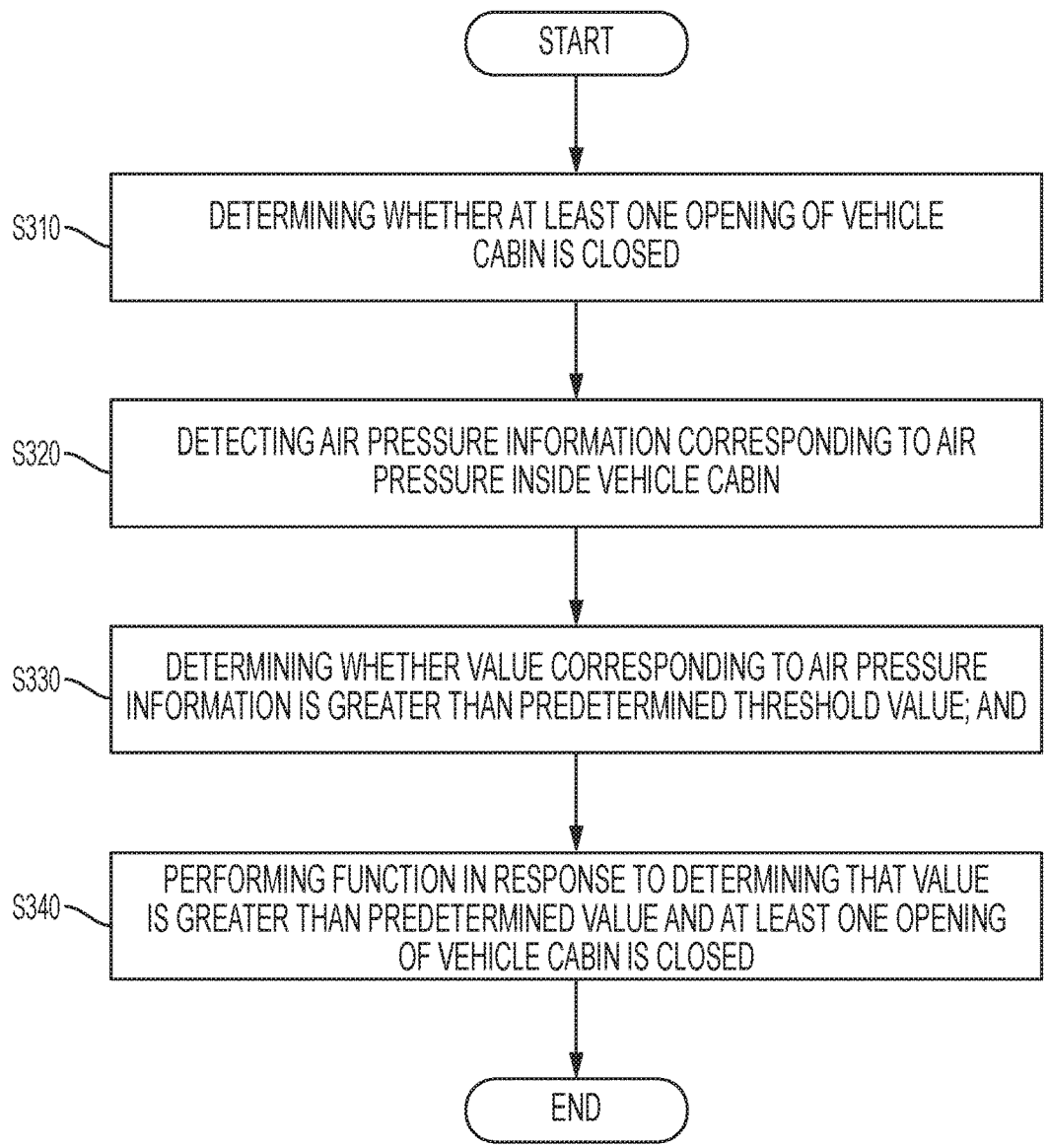
FIG. 3 shows a flowchart for a method of detecting airbag deployment according to an aspect of an exemplary embodiment.

FIG. 3 shows a flowchart for a method for detecting airbag deployment according to an exemplary embodiment. The method of FIG. 3 may be performed by the apparatus for detecting airbag deployment 100 or may be encoded into a computer readable medium as instructions that are executable by a computer to perform the method.

Referring to FIG. 3, it is determined whether at least one opening of a vehicle cabin is closed in operation S310. For example, one or more of whether the roof of the vehicle is closed, whether a window of a vehicle is closed, whether a door of a vehicle is closed, and whether a sunroof of a vehicle is closed may be determined in operation S310.

In operation S320, air pressure information corresponding to air pressure inside a cabin of a vehicle is detected. Then, it is determined whether a value corresponding to air pressure information is greater than a predetermined threshold value in operation S330. In operation S340, a function is performed in response to determining that the value corresponding to air pressure information is greater than the predetermined threshold value and that the at least one opening of a vehicle cabin is closed.

Figure 4:
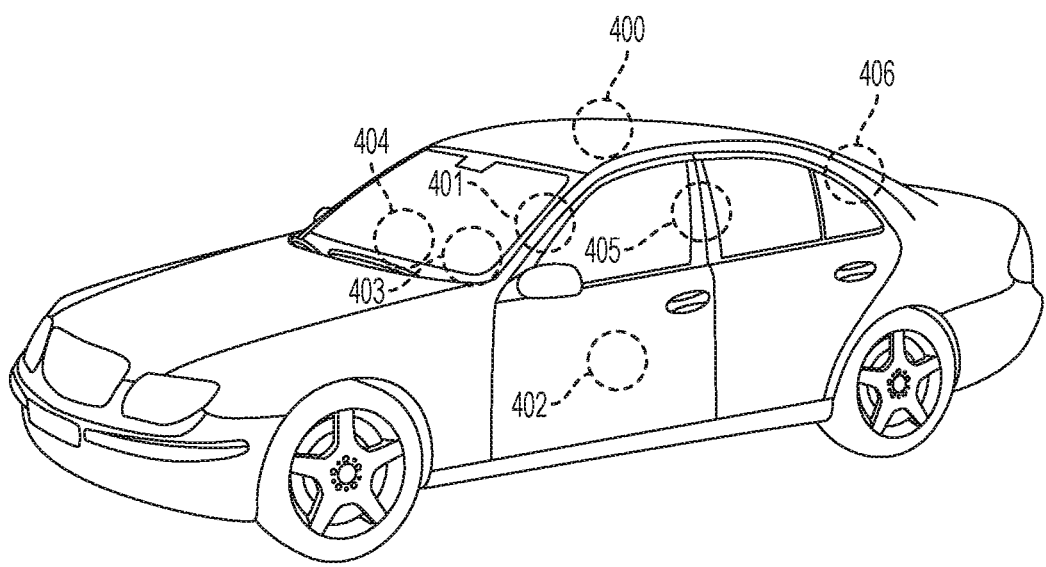
FIG. 4 shows an illustration of a vehicle and locations of one or more air pressure sensors according to an aspect of an exemplary embodiment.

FIG. 4 shows an illustration of a vehicle and locations of one or more air pressure sensors. Referring to FIG. 4, air pressure sensors may be located in one or more from among of a headliner or roof 400 of the vehicle, an A-Pillar (front) 401, a door 402, an instrument panel 403, a center stack 404, B-Pillar (middle) 405, a C-Pillar (rear) 406.

Figure 5:
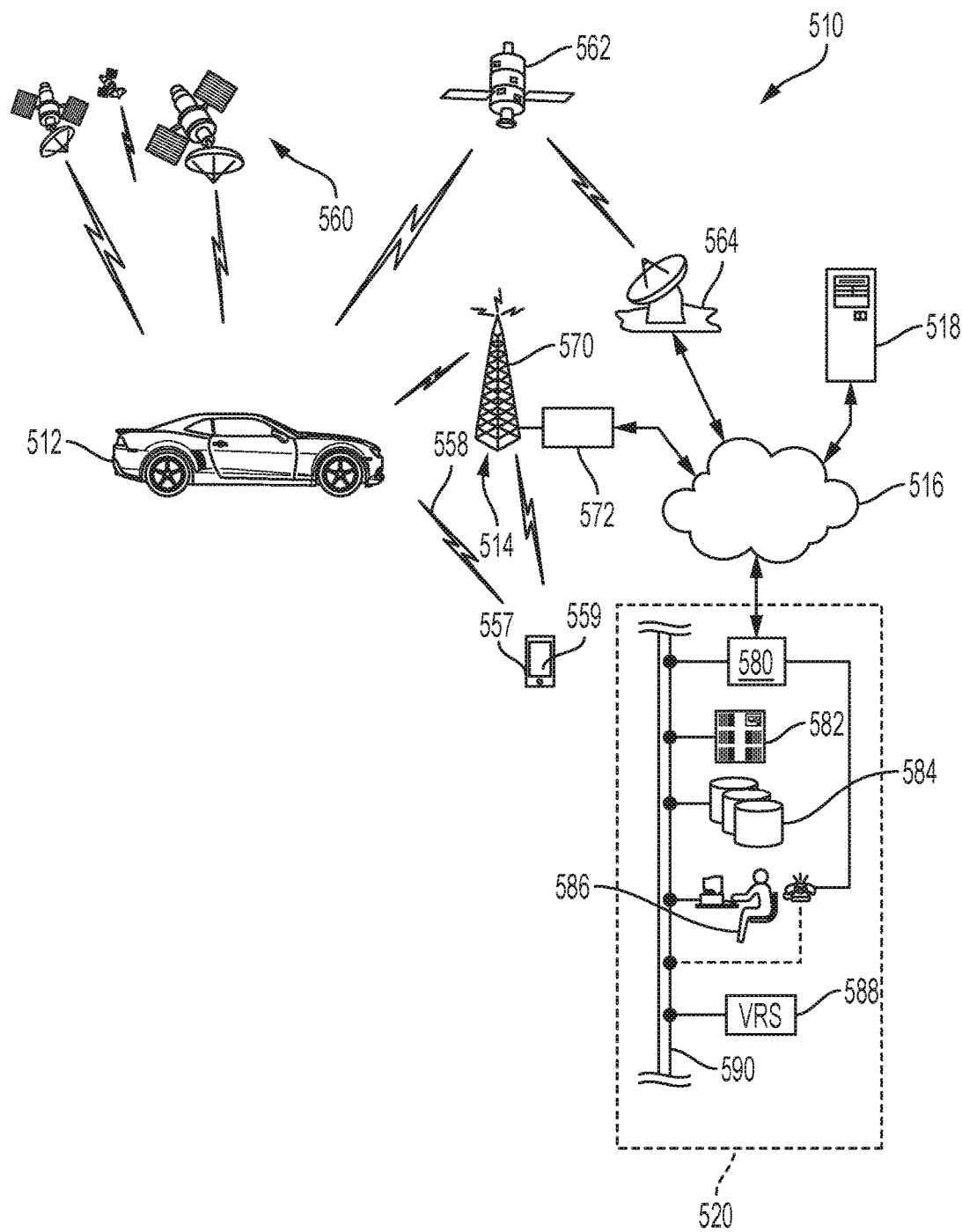
FIG. 5 shows an illustration of an operating environment of an apparatus that detects airbag deployment according to an aspect of an exemplary embodiment.

FIG. 5 shows an illustration of an operating environment that comprises a mobile vehicle communications system 510 and that can be used to implement the apparatus and the method for detecting airbag deployment disclosed herein.

Referring to FIG. 5, an operating environment that comprises a mobile vehicle communications system 510 and that can be used to implement apparatus and the method for detecting airbag deployment is shown. Communications system 510 may include one or more from among a vehicle 512, one or more wireless carrier systems 514, a land communications network 516, a computer 518, and a call center 520. It should be understood that the disclosed apparatus and the method for detecting airbag deployment can be used with any number of different systems and is not specifically limited to the operating environment shown here. The following paragraphs simply provide a brief overview of one such communications system 510; however, other systems not shown here could employ the disclosed apparatus and the method for detecting airbag deployment as well.

Vehicle 512 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. One or more elements of apparatus for detecting air bag deployment 100 shown in FIG. 1 may be incorporated into vehicle 512.

One of the networked devices that can communicate with the communication device 108 is a wireless device, such as a smart phone 557. The smart phone 557 can include computer processing capability, a transceiver capable of communicating using a short-range wireless protocol 558, and a visual smart phone display 559. In some implementations, the smart phone display 559 also includes a touch-screen graphical user interface and/or a GPS module capable of receiving GPS satellite signals and generating GPS coordinates based on those signals.

The GPS module of the communication device 108 may receive radio signals from a constellation 560 of GPS satellites. From these signals, the communication device 108 can determine vehicle position that is used for providing navigation and other position-related services to the vehicle driver. Navigation information can be presented by the output 104 (or other display within the vehicle) or can be presented verbally such as is done when supplying turn-by-turn navigation. The navigation services can be provided using a dedicated in-vehicle navigation module, or some or all navigation services can be done via the communication device 108. Position information may be sent to a remote location for purposes of providing the vehicle with navigation maps, map annotations (points of interest, restaurants, etc.), route calculations, and the like. The position information can be supplied to call center 520 or other remote computer system, such as computer 518, for other purposes, such as fleet management. Moreover, new or updated map data can be downloaded by the communication device from the call center 520.

The vehicle 512 may include vehicle system modules (VSMs) in the form of electronic hardware components that are located throughout the vehicle and typically receive input from one or more sensors and use the sensed input to perform diagnostic, monitoring, control, reporting and/or other functions. Each of the VSMs may be connected by a communications bus to the other VSMs, as well as to the controller 101, and can be programmed to run vehicle system and subsystem diagnostic tests. The controller 101 may be configured to send and receive information from the VSMs and to control VSMs to perform vehicle functions. As examples, one VSM can be an engine control module (ECM) that controls various aspects of engine operation such as fuel ignition and ignition timing, another VSM can be a powertrain control module that regulates operation of one or more components of the vehicle powertrain, and another VSM can be a body control module that governs various electrical components located throughout the vehicle, like the vehicle's power door locks and headlights. According to an exemplary embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 512, as numerous others are also possible.

Wireless carrier system 514 may be a cellular telephone system that includes a plurality of cell towers 570 (only one shown), one or more mobile switching centers (MSCs) 572, as well as any other networking components required to connect wireless carrier system 514 with land network 516. Each cell tower 570 includes sending and receiving antennas and a base station, with the base stations from different cell towers being connected to the MSC 572 either directly or via intermediary equipment such as a base station controller. Cellular system 514 can implement any suitable communications technology, including for example, analog technologies such as AMPS, or the newer digital technologies such as CDMA (e.g., CDMA2000 or 1×EVDO) or GSM/GPRS (e.g., 4G LTE). As will be appreciated by those skilled in the art, various cell tower/base station/MSC arrangements are possible and could be used with wireless system 514. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 514, a different wireless carrier system in the form of satellite communication can be used to provide uni-directional or bi-directional communication with the vehicle. This can be done using one or more communication satellites 562 and an uplink transmitting station 564. Uni-directional communication can be, for example, satellite radio services, wherein programming content (news, music, etc.) is received by transmitting station 564, packaged for upload, and then sent to the satellite 562, which broadcasts the programming to subscribers. Bi-directional communication can be, for example, satellite telephony services using satellite 562 to relay telephone communications between the vehicle 512 and station 564. If used, this satellite telephony can be utilized either in addition to or in lieu of wireless carrier system 514.

Land network 516 may be a land-based telecommunications network that is connected to one or more landline telephones and connects wireless carrier system 514 to call center 520. For example, land network 516 may include a public switched telephone network (PSTN) such as that used to provide hardwired telephony, packet-switched data communications, and the Internet infrastructure. One or more segments of land network 516 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 520 need not be connected via land network 516, but could include wireless telephony equipment so that it can communicate directly with a wireless network, such as wireless carrier system 514.

Computer 518 can be one of a number of computers accessible via a private or public network such as the Internet. Each such computer 518 can be used for one or more purposes, such as a web server accessible by the vehicle via the communication device 108 and wireless carrier 514. Other such accessible computers 518 can be, for example: a service center computer where diagnostic information and other vehicle data can be uploaded from the vehicle via the communication device 108; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 512 or call center 520, or both. A computer 518 can also be used for providing Internet connectivity such as DNS services or as a network address server that uses DHCP or other suitable protocol to assign an IP address to the vehicle 512.

Call center 520 is designed to provide the vehicle electronics with a number of different system back-end functions and, according to the exemplary embodiment shown here, generally includes one or more switches 580, servers 582, databases 584, live advisors 586, as well as an automated voice response system (VRS) 588. These various call center components may be coupled to one another via a wired or wireless local area network 590. Switch 580, which can be a private branch exchange (PBX) switch, routes incoming signals so that voice transmissions are usually sent to either the live adviser 586 by regular phone or to the automated voice response system 588 using VoIP. The live advisor phone can also use VoIP as indicated by the broken line in FIG. 5. VoIP and other data communication through the switch 580 is implemented via a modem (not shown) connected between the switch 580 and network 590. Data transmissions are passed via the modem to server 582 and/or database 584. Database 584 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 520 using live advisor 586, it will be appreciated that the call center can instead utilize VRS 588 as an automated advisor or, a combination of VRS 588 and the live advisor 586 can be used.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for detecting airbag deployment, the method comprising:
   detecting, whether at least one opening of a vehicle cabin is closed;
   detecting, by an air pressure sensor disposed in at least one from among a vehicle door, a vehicle floor, an A-Pillar, a B-Pillar, a C-Pillar, and a vehicle roof, air pressure information corresponding to air pressure inside the vehicle cabins;
   determining whether a value corresponding to the air pressure information is greater than a predetermined value corresponding to the airbag deployment; and
   detecting the airbag deployment and sending information indicating the airbag deployment in response to determining that the value is greater than the predetermined value and that the at least one opening of the vehicle cabin is closed.

2. The method of claim 1, wherein the sending information indicating the airbag deployment comprises transmitting the information indicating the airbag deployment to dispatch emergency workers.

3. The method of claim 2, further comprising transmitting location information.

4. The method of claim 1, wherein the air pressure information comprises a value corresponding to the air pressure inside the vehicle cabin.

5. The method of claim 1, wherein the air pressure information comprises a value corresponding to a change in the air pressure inside the vehicle cabin.

6. An apparatus for detecting airbag deployment, the apparatus comprising:
   an air pressure sensor disposed in at least one from among a vehicle door, a vehicle floor, an A-pillar, a B-Pillar, a C-Pillar, and a vehicle roof, the air pressure sensor configured to detect air pressure information corresponding to air pressure inside a vehicle cabin;
   at least one memory comprising computer executable instructions; and
   at least one processor configured to read and execute the computer executable instructions, the computer executable instructions causing the at least one processor to:
   determining whether at least one opening of the vehicle cabin is closed;
   receive the air pressure information corresponding to the air pressure inside the vehicle cabin;
   determine whether a value corresponding to the air pressure information is greater than a predetermined value corresponding to the airbag deployment; and
   detect the airbag deployment and send information indicating the airbag deployment in response to determining that the value is greater than the predetermined value and the at least one opening of the vehicle cabin is closed.

7. The apparatus of claim 6, wherein the air pressure sensor comprises a plurality of sensors configured to provide air pressure information.

8. The apparatus of claim 6, wherein the processor is further configured to transmit the information indicating the airbag deployment to dispatch emergency workers.

9. The apparatus of claim 8, wherein the processor is further configured to transmit location information.

10. The apparatus of claim 6, wherein the air pressure information comprises a value corresponding to the air pressure inside the vehicle cabin.

11. The apparatus of claim 6, wherein the air pressure information comprises a value corresponding to a change in the air pressure inside the vehicle cabin.

12. A non-transitory computer readable medium comprising computer executable instructions executable by a processor to perform a method for detecting airbag deployment, the method comprising:
   determining whether at least one opening of a vehicle cabin is closed;
   detecting, by an air pressure sensor disposed in at least one from among a vehicle door, a vehicle floor, an A-pillar, a B-Pillar, a C-Pillar, and a vehicle roof, air pressure information corresponding to air pressure inside the vehicle cabin;

determining whether a value corresponding to the air pressure information is greater than a predetermined value corresponding to the airbag deployment; and detecting the airbag deployment and sending information indicating the airbag deployment in response to determining that the value is greater than the predetermined value and the at least one opening of the vehicle cabin is closed.

13. The non-transitory medium of claim 12, wherein the sending the information comprises transmitting the information indicating the airbag deployment to dispatch emergency workers.

14. The non-transitory medium of claim 13, wherein the method further comprises transmitting location information.

15. The non-transitory medium of claim 12, wherein the air pressure information comprises a value corresponding to the air pressure inside the vehicle cabin.

16. The non-transitory medium of claim 12, wherein the air pressure information comprises a value corresponding to a change in the air pressure inside the vehicle cabin.

* * * * *